(12) United States Patent
Mahendraker et al.

(10) Patent No.: US 9,747,381 B1
(45) Date of Patent: Aug. 29, 2017

(54) QUERYING AND CONFIGURING AN IDENTITY MANAGEMENT FRAMEWORK

(71) Applicant: Oracle America, Inc., Redwood City, CA (US)

(72) Inventors: Deepa Mahendraker, Cupertino, CA (US); Aravindan Ranganathan, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 302 days.

(21) Appl. No.: 14/703,776

(22) Filed: May 4, 2015

Related U.S. Application Data

(63) Continuation of application No. 11/486,567, filed on Jul. 14, 2006, now abandoned.

(51) Int. Cl.
| | | |
|---|---|---|
| G06F 15/177 | (2006.01) | |
| G06F 17/30 | (2006.01) | |
| G06F 21/62 | (2013.01) | |

(52) U.S. Cl.
CPC .. G06F 17/30876 (2013.01); G06F 17/30395 (2013.01); G06F 21/6218 (2013.01)

(58) Field of Classification Search
CPC .......... H04L 63/104; H04N 21/25875; H04W 12/06; G06F 17/30991; G06F 21/31
See application file for complete search history.

(56) References Cited

U.S. PATENT DOCUMENTS

| | | | |
|---|---|---|---|
| 2006/0031237 A1* | 2/2006 | DeAnna ................. | G06F 9/465 |
| 2006/0031672 A1* | 2/2006 | Soltis, Jr. ............ | G06F 21/6281 |
| | | | 713/164 |
| 2006/0195476 A1* | 8/2006 | Nori ................. | G06F 17/30607 |
| 2014/0189779 A1* | 7/2014 | Baghdasaryan ........ | H04L 63/08 |
| | | | 726/1 |

* cited by examiner

*Primary Examiner* — Hitesh Patel
(74) *Attorney, Agent, or Firm* — Martine Penilla Group, LLP

(57) ABSTRACT

A processor-executed access manager with an identity management framework receives a first query from a user of a client device connected to a network for a system. The query seeks information as to identity types supported by the system. The access manager responds to the first query with a list of supported identity types. The supported identity types include at least a hardware device, a role, and a user. The list is retrieved from a global configuration data structure in a global data store. The access manager receives a second query from the user for identities of the hardware devices associated with one of the supported identity types. And the access manager responds to the second query with the identity of a specific hardware device, if the user is permitted to access the specific hardware device according to permissions obtained through the global configuration data structure.

17 Claims, 6 Drawing Sheets

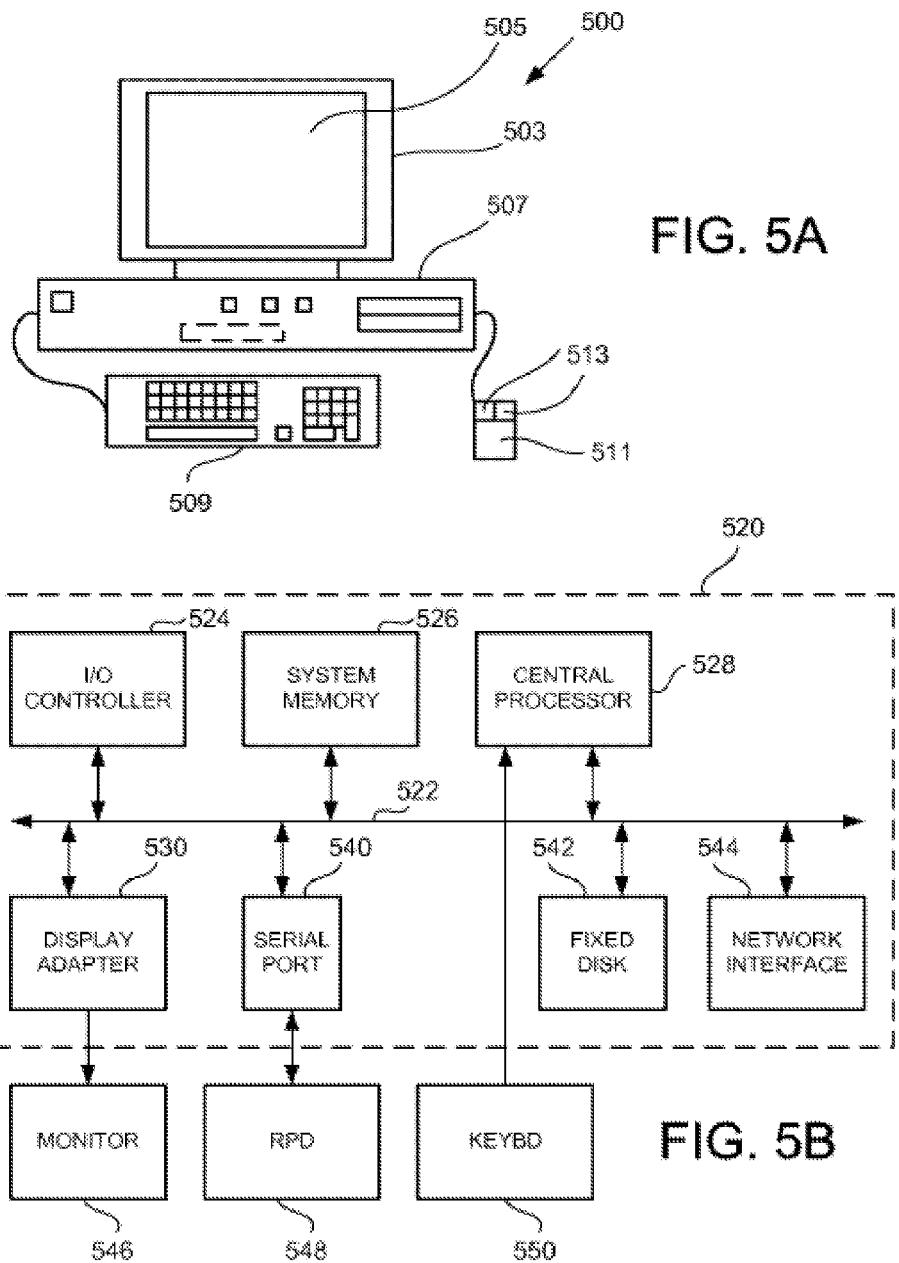

QUERYING AND CONFIGURING AN IDENTITY MANAGEMENT FRAMEWORK

RELATED APPLICATION

This application is a continuation application of U.S. patent application Ser. No. 11/486,567, filed on Jul. 14, 2006, and entitled "Capability to Query and Configure An Identity Management Framework for Supported Types and Operations". The disclosure of that earlier application is incorporated by reference herein for all purposes.

FIELD OF THE INVENTION

The invention relates generally to the access management of system resources, and more particularly, to a system and method for configuring and querying an identity management framework for supported identity types and supported operations.

DESCRIPTION OF THE RELATED ART

Conventionally, access management involves the protection of information from unauthorized disclosure, modification, use, etc. To protect such information, companies have utilized access management tools which implement company-based policies that determine who can or cannot access specific classes of business and/or personal information. However, as the complexity of business infrastructures increases and the need for scalability within such complex infrastructures correspondingly increases, businesses have a growing need to provide "smart" solutions to the access management of protected resources.

In view of the forgoing, there is a need for an access management approach that includes capabilities for configuring and querying an identity management framework to manage a diverse set of resources which are of themselves complex and typically distributed across multiple and disparate environments, including Internet and wireless environments etc.

SUMMARY

In one embodiment, the present invention provides a system for configuring and querying an identity management framework. The system comprises a global configuration data structure that includes system-level access information. The computer system further comprises a server, the server hosting an access manager, the access including an identity management framework, where the access manager is capable of configuring the identity management framework based on the system-level access information of the global configuration data structure, and wherein the access manager is capable of providing a capability to query the identity management framework for the system-level access information in response to a query.

In another embodiment, the present invention provides a method for enabling a system to configure and query an identity management framework. The method comprises enabling the definition of a global configuration data structure, wherein the global configuration data structure is capable of storing system-level access information. If the identity management framework is set for static configuration, the method comprises enabling a retrieval of the system-level access information from a plug-in, and storing the system-level access information received from the plug-in in the global configuration data structure. If the identity management framework is set for dynamic configuration, enabling a retrieval of the system-level access information from a plug-in, or from the global configuration data structure, or from the plug-in and the global configuration data structure, wherein the retrieval of the system-level access information is in response to a query, and wherein the system-level access information is stored in the global configuration data structure.

In another embodiment, the present invention provides a computer-readable media for directing a computer to facilitate the configuring and the querying of an identity management framework. The computer-readable media comprises instructions for enabling the definition of a global configuration data structure, where the global configuration data structure is capable of storing system-level access information. If the identity management framework is set for static configuration, the computer-readable media comprises instructions for enabling a retrieval of the system-level access information from a plug-in, and storing the system-level access information received from the plug-in in the global configuration data structure. If the identity management framework is set for dynamic configuration, instructions for enabling a retrieval of the system-level access information from a plug-in, or from the global configuration data structure, or from the plug-in and the global configuration data structure, wherein the retrieval is performed in response to a query, and wherein the system-level access information retrieved from the plug-in in response to the query is stored in the global configuration data structure.

In yet another embodiment, the present invention provides a global configuration data structure for facilitating configuring and querying an identity management framework. The global configuration data structure comprises a supported operations entry, the supported operations entry defining a list of operations supported by the system. The global configuration data structure also comprises a supported identities entry, the supported identities entry defining a specific identity supported by the system. The global configuration data structure further comprises an identity type entry, the identity type entry defining a specific identity type. The global configuration data structure further comprises a resource configuration entry, the resource configuration entry defining an access configuration of a protected system resource.

Other aspects and advantages of the invention will become apparent from the following detailed description, taken in conjunction with the embodiments and accompanying drawings, illustrating, by way of example, the principles of the invention.

BRIEF DESCRIPTION OF THE DRAWINGS

The invention, together with further advantages thereof, may best be understood by reference to the following description taken in conjunction with the accompanying drawings in which:

FIG. 5A is a generalized diagram of a typical computer suitable for use with the present invention;

FIG. 5B shows subsystems in the typical computer of FIG. 5A; and

DETAILED DESCRIPTION

Figure 1:
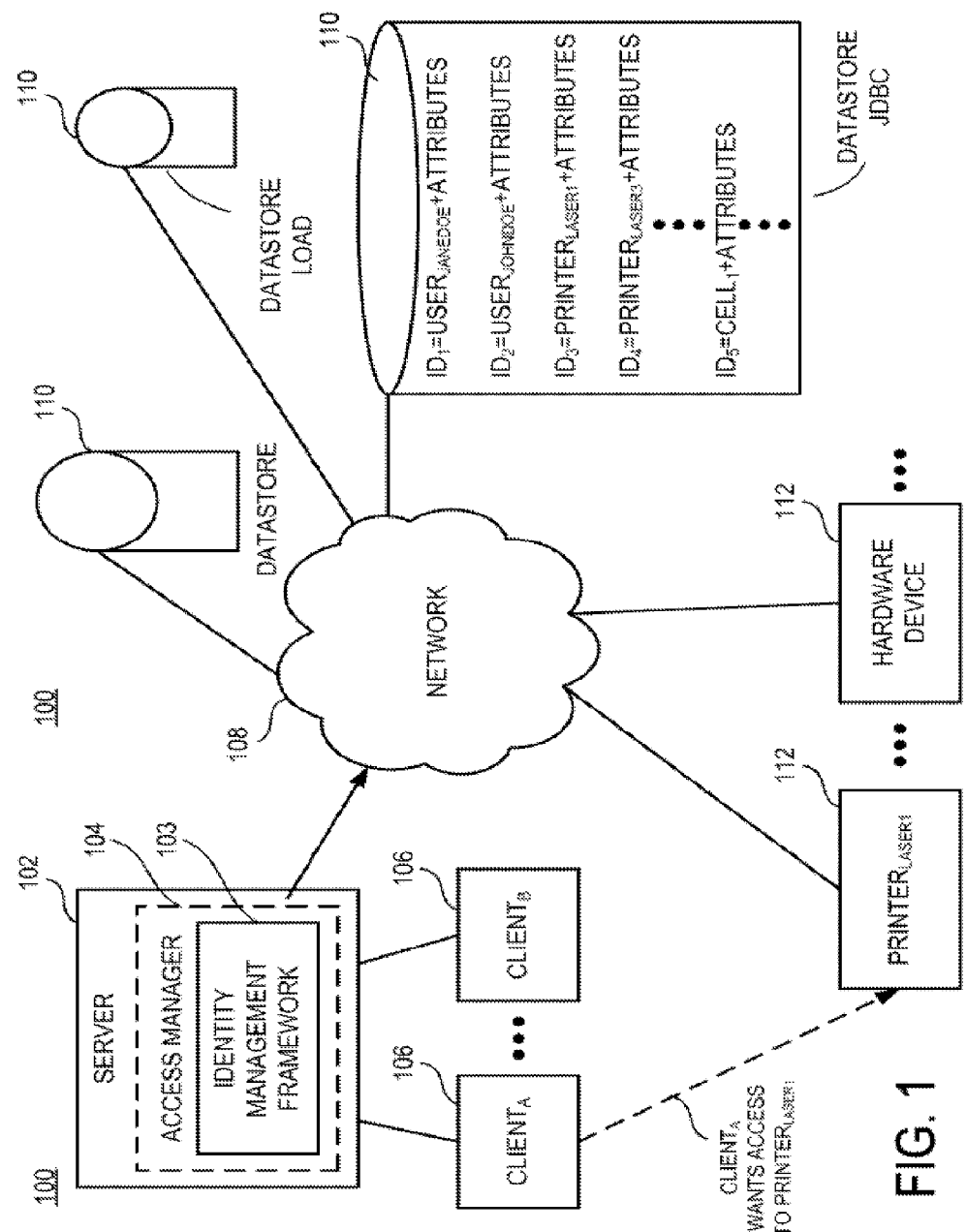
FIG. 1 is an illustration of a computer system in which embodiments of the present invention can be implemented.

Embodiments of the present invention provide methods and systems for configuring and querying an identity management framework for supported identity types and supported operations etc. within a "plug-and-play" access management architecture. Specifically, embodiments of the present invention can be implemented within a "plug-and-play" access management architecture in which each protected resource (e.g., data store, file, hardware device, etc.) of a system can contain identity specific information and can have associated with it a resource-specific "plug-in" module that allows the identity management framework to, at one level, configure access to a protected resource (e.g. data store etc.) and to, at another level, communicate with and obtain identity specific information from a protected resource in a manner that allows system administrators, runtime applications, or other utilities, etc. to determine in advance, without any pre-existing knowledge, the operations supported by the system, the identities supported by the system, the identity types supported by a system, and the identity names and attributes corresponding to a particular identity type. The term "identity" (or "identities") generally refers to a specific object within a system, for example User$_{JaneDoe}$, User$_{JohnDoe}$, Printer$_{Laser1}$, Printer$_{Laser2}$ etc., which can correspond to an entry in a data store etc. The term "identity name" can correspond to a unique identity identifier, for example "JaneDoe." The term "attribute" can correspond to a particular identity and generally refers to the properties or attributes associated with that identity. For example, the attributes associated with the Printer$_{Laser1}$ identity can include the printer's location (or address), whether the printer can print black/white or color, etc. The term "identity type" generally refers to a specific category of identity, for example USER, GROUP, ROLE, AGENT, ENTITY, ORGANIZATION, PRINTER, etc. The term "operations" generally refers to the actions that one can perform on a particular identity type or identity, for example READ, WRITE, DELETE, EDIT, CREATE, READ_AT-TRIBUTES, WRITE_ATTRIBUTES, ADD_USER_TO_GROUP, DELETE_FILE, PRINT_FILE, MAKE_CALL (for a phone device etc.), ANSWER_CALL (for a phone device etc.), BOOT_DEVICE (for hardware device), etc.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention. The present invention includes several aspects and is presented below and discussed in connection with the Figures and embodiments.

In FIG. 1, is an illustration of a System 100 (e.g., business enterprise system, etc.) including a Server 102 hosting an Access Manager code module 104, Client(s) 106 connected to the Server 102, and a Network 108 that provides connectivity between the Client(s) 106 and/or the Server 102 and the Data Store(s) 110, Devices 112, etc. which are attached to the Network 108. The Server 102 can be provided as a web server, application server, or any other server, etc. In one embodiment of the present invention, as discussed in detail below, the Access Manager module 104 is based on a "plug-and-play" architecture and includes an Identity Management Framework code module 103 that utilizes resource specific "plug-in" code modules to provide the capability to configure and query the Identity Management Framework 103 for the supported identity types and operations etc. of the System 100.

Specifically, the Identity Management Framework 103 is capable of being configured in a manner that, at a global system level, defines the identity types and the operations supported etc. by the System 100. These definitions can then be used by the Identity Management Framework 103 to respond to Client 106 queries, as discussed below, and to define access protections for a system resource (e.g. 110, 112, etc.) that determine which entities can access the protected system resource (i.e. which identity type or identity etc.) and what operations these entities can perform on the protected system resource once they have access to the protected resource. For example, "DataStore$_{JDBC}$" 110 can be defined as a "read-only user repository" where entities having a USER identity type can only perform READ operations on the entries stored on the DataStore$_{JDBC}$ 110, but cannot CREATE new entries or MODIFY existing entries. It should be apparent to those of ordinary skill that embodiments of the present invention are applicable to any category of protected system resource including, but not limited to, data stores (databases), files, applications, servers, hardware devices, etc.

The Identity Management Framework 103 is also capable of being queried by a Client 106 for supported identity types, operations, etc. in a manner that allows a Client 106 to perform administrative functions at an administrative console or allows a runtime application or other utility etc. executing on a Client 106 machine to submit a query to the Identity Management Framework 103 (via the Access Manager 104) requesting the identity types and/or operations etc. supported by the System 100. The query can include, but is not limited to, a request for the system supported identity types, the system supported operations, and the system supported identities, identity names and corresponding attributes. In response to a Client 106 query, the Identity Management Framework 103 of the Access Manager 104 can retrieve system-level access information relevant to the Client 106 query from any system resource (e.g. Data Store 110, Device 112 etc.) via resource specific "plug-ins" (see FIG. 2) and communicate a response back to the Client 106 via the Server 102.

For example, for purposes of illustration only, suppose Client$_A$ administrator (or a Client$_A$ application or utility) would like to print a file, Client$_A$ would first need to know whether there are any printers attached to the Network 108. Further suppose that Data Store$_{JDBC}$ 110 is a Java Database Connectivity (JDBC)-based repository that stores identity specific information for identities USER$_{JaneDoe}$, USER$_{JohnDoe}$, ROLE$_{Manager}$, and ROLE$_{Executive}$, and PRINTER$_{Laser3}$, and that "Data Store$_{LDAP}$" is a Lightweight Directory Access Protocol (LDAP)-based repository that stores identity specific information for identities USER$_{Jim\ Doe}$, USER$_{Jorge\ Doe}$, and PRINTER$_{HighSpeed6}$. In the present example, the USER, ROLE, and PRINTER "identity types" would be returned to the Client 106 by the Identity Management Framework 103 in response to a Client 106 query requesting all of the identity types supported by the System 100. As a result, Client$_A$ 106 knows that the PRINTER identity type is a supported identity type of the System 100, and Client$_A$ 106 can query the Identity Management Framework 103 for all of the "identities" of type PRINTER supported by the System 100 which, in the present example, are PRINTER$_{Laser3}$ and PRINTER$_{HighSpeed6}$ and, based on this information, the Client$_A$ 106 can further query the Identity Management Framework 103 for the set of operations that can be performed on PRINTER$_{Laser3}$ and/or PRINTER$_{HighSpeed6}$ and by whom, and what operations PRINTER$_{Laser3}$ and/or PRINTER$_{HighSpeed6}$ can perform. In an alternate embodiment of the present invention, the Identity Management Framework 103 can have the capability of obtaining identity specific information, in response to a Client 106 request, from the PRINTER$_{Laser3}$ and PRINTER$_{HighSpeed6}$ itself or any other device rather than, or in combination with the PRINTER$_{Laser3}$ and/or PRINTER$_{HighSpeed6}$ identity specific information that can be stored on a Data Store 110.

Figure 2:
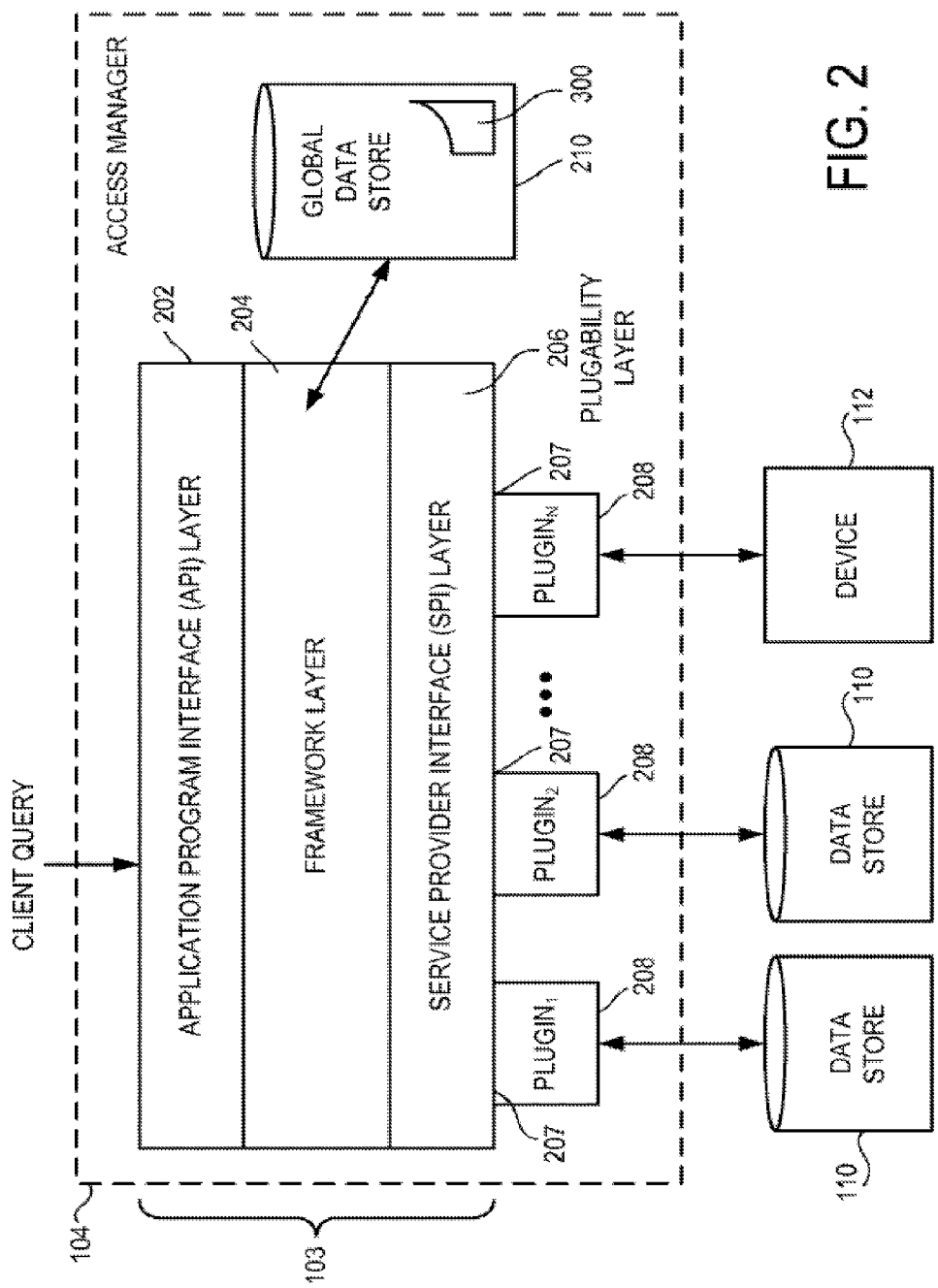
FIG. 2 is an illustration of an identity management framework in which embodiments of the present invention can be implemented.

In FIG. 2, in one embodiment of the present invention, the Identity Management Framework 103 is implemented within a "plug-and-play" architecture and includes: an Application Program Interface (API) Layer 202 that provides an interface between a Client 106 (see FIG. 1) and the Identity Management Framework 103; a Framework Layer 204 that implements the logic necessary for configuring and querying the Identity Management Framework 103; a Global Data Store 210 that is coupled to the Framework Layer 204 and that stores the identity specific information in a Global System Configuration Data Structure 300 (see FIG. 3); a Service Provider Interface (SPI) Layer 206 that includes "Plug-in" Interfaces 207 which couple the SPI Layer 206 to individual resource specific Plug-in module(s) 208; and Plug-In module(s) 208 which provide the additional logic necessary for the Framework Layer 204 to build the Global Information Data Structure 300 and respond to Client 106 queries. It is important to note that the Plug-in module(s) 208 can be data store specific plug-ins (e.g. JDBC-based, LDAP-based etc.), device specific plug-ins (e.g., printer, cell phone, scanner, etc.), or any other plug-in relevant to a particular system.

In one embodiment, referring still to FIG. 2, a Client 106 query is received by the API Layer 202. The API Layer 202 forwards the Client 106 query to the Framework Layer 204. In response, depending on whether the Identity Management Framework 103 is configured to statically or dynamically build the Global Configuration Data Structure 300 that is stored on the Global Data Store 210, the Framework Layer 204 can utilize a previously initialized Global Configuration Data Structure 300 to provide the information necessary to respond to the Client 106 query and/or the Framework Layer 204 can utilize calls to selected resource specific "Plug-in" 208 modules to provide some or all of the system-level access information necessary to respond to the Client 106 query. In the case where the Global Configuration Data Structure 300 is statically built, the Framework Layer 204, during pre-processing (initialization) and before any Client 106 queries are received by the API Layer 202, asks each Plug-in module 208 to report all or some selected portion of its capabilities to the Framework Layer 204 and the information is stored in the Global Configuration Data Structure 300. In the case where the Global Configuration Data Structure 300 is dynamically built, as Client 106 queries are received, the Framework Layer 204 asks selected Plug-in modules 208 to report their capabilities that are relevant to the Client 106 request and this information is both stored in the Global Configuration Data Structure 300 and sent to the Client 106. In both cases, however, each Plug-in 208 provides information to the Framework Layer 204 by communicating with a system resource (110, 112, etc.) associated with the Plug-in module 208, via the SPI Layer 206, and obtaining identity specific information from the system resource (110, 112, etc.). The information obtained by the Plug-in module(s) 208 from their respective system resources (110, 112, etc.) can include the identity types, the identities, and the identity names and corresponding attributes etc. supported by each system resource. The Framework Layer 204, after receiving the information via the SPI Layer 206, can then combine all of the information received from each Plug-in module 208, enter the information in the Global Configuration Data Structure 300 (if the information is not already entered), and utilize the information to respond to the Client 106 query via the API Layer 202.

One advantage of the embodiments of the present invention is a Client 106 can receive data from the Identity Management Framework 103, without knowing or needing to know that the data may be coming from disparate and otherwise incompatible sources, for example JDBC-based Data Stores 110 vs. LDAP-based Data Stores 110, and Devices 112, etc. Moreover, based on the discussion above, it becomes apparent that the Framework Layer 208 serves at least two-fold purposes. First, as previously mentioned, the Framework Layer 204 hides the Plug-in modules 208 to transparently provide data to the Client 106. Second, the Framework Layer 204 alleviates system conflicts by utilizing a global configuration data approach.

Figure 3:
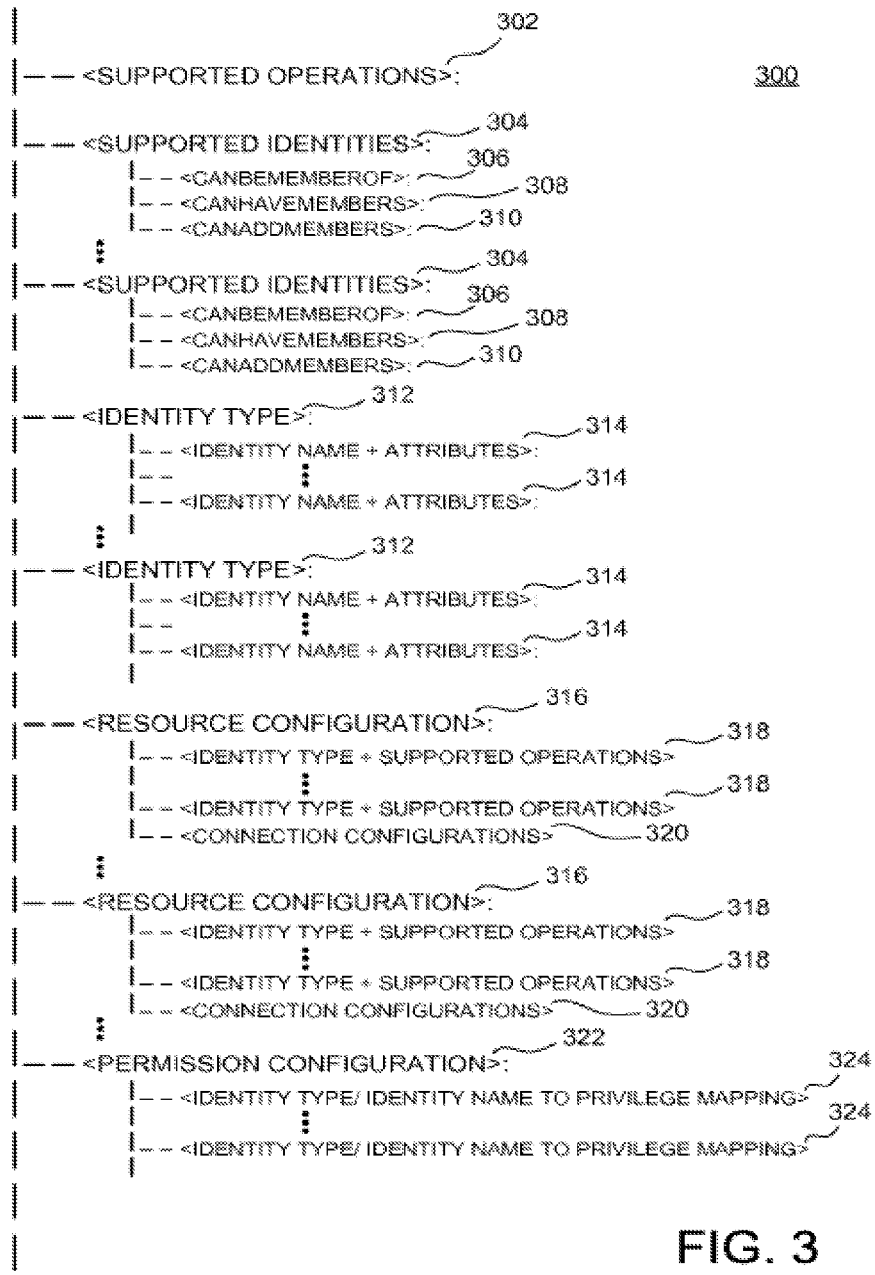
FIG. 3 is an illustration of an exemplary global configuration data structure, in accordance with an embodiment of the present invention.

In FIG. 3, in one embodiment of the present invention, an exemplary Global Configuration Data Structure 300 is provided. The Global Configuration Data Structure 300 can include a "Supported Operations" entry 302 which defines a list of system supported operations. For example, the list of system supported operations associated with the Supported Operations entry 302 can include READ, WRITE, PRINT_FILE, GET_ATTRIBUTES, SET_ATTRIBUTES, CREATE, MODIFY, EDIT, BOOT, etc. It is important to note, however, that the list of supported operations provided herein is illustrative and is in no way meant to be exhaustive. As such, those of ordinary skill will recognize that a list of system supported operations can include any operation that is required by a system and that can be performed on an identity type, identity, etc.

The Global Configuration Data Structure 300 of an embodiment of the present invention can also include one or more "Supported Identities" entries 304. Each Supported Identities entry 304 can define a specific identity that is supported by the system, for example a GROUP$_{SoftwareProcessing}$ identity. Additionally, for each Supported Identities entry 304 there can be a corresponding "CanBeMemberOf" entry 306 that provides a list of the identity types that the specific identity can be a member of, a "CanHaveMembers" entry 308 that provides a list of the identity types that the specific identity can have as a member, and a "CanAddMembers" entry 310 that provides a list of the identity types that the specific identity can add as a member. For example, the GROUP$_{SoftwareProcessing}$ identity can be a member of an ORGANIZATION identity type, can have a USER identity type as a member, and can add a ROLE identity type as a member.

The Global Configuration Data Structure 300 of an embodiment of the present invention can also include one or more "Identity Type" entries 312. Each Identity Type entry 312 can define a specific identity type, for example a ROLE, a USER, a GROUP, an AGENT, an ENTITY, or an ORGANIZATION etc. identity type. Additionally, for each Identity Type entry 312 there can be one or more corresponding "Identity Name & Attribute" entries 314 that provide a set of identity names and attributes associated with the specific identity type. For example, the ROLE identity type can have associated with it a list containing an identity name Manager (plus attributes) and an identity name Vendor (plus attributes).

The Global Configuration Data Structure 300 of an embodiment of the present invention can further include one or more "Resource Configuration" entries 316 where each Resource Configuration entry 316 defines the access configuration for specific system resource. For example, each Resource Configuration entry 316 can provide an access configuration that designates the DataStore$_{JDBC}$ 110 as a "read-only user repository." More particularly, in one embodiment of the present invention, each Resource Configuration entry 316 can correspond to one or more of an "Identity Type+Supported Operations" entry 318 and a "Connection Configurations" entry 322. Each Identity Type+Supported Operations entry 318 defines the identity types and operations supported for each identity type which are associated with a particular system resource. For example, USER=READ, WRITE; ROLE=READ; and PRINTER=PRINT, CHECK_QUEUE etc. Each Connection Configurations entry 320 defines the resource specific configurations that are required to connect to a particular protected system resource, for example, the hostname, the port, or the credentials, etc. that are necessary to access the system resource.

The Global Configuration Data Structure 300 of an embodiment of the present invention can further include a "Permission Configuration" entry 322 that defines the privilege(s) that are granted to general identity types or specific identity names that are associated with a particular identity type, system resource, etc. Specifically, the Permission Configuration entry 322 can correspond to one or more "Identity Type/Identity Name To Privilege Mapping" entries 324 that provide a mapping of identities to their privileges. For example, USER$_{JohnDoe}$ can be granted READ, WRITE privileges for identity types USER, ROLE, GROUP; ROLE$_{Manager}$ can be granted PRINT privileges for identity type PRINTER; and, similarly, AGENT, irrespective of who belongs to the AGENT identity type, can be granted READ, WRITE, MODIFY, CREATE privileges for identity types USER and GROUP.

In an embodiment of the present invention, by utilizing an XML schema and linked lists (or some other equivalent method etc.), each entry of the Global Configuration Data Structure 300 can be linked to all or some subset of the entries defined by the Global Configuration Data Structure 300. For example, a Supported Operations entry 302 can be linked with a Resource Configuration 316 entry, an Identity Type entry 312 can be linked with a Permission Configuration entry 322, and so on. In this manner, the configuration of the System 100 can be customized to accommodate unique or evolving system access requirements without the need for application-level software modifications.

Figure 4:
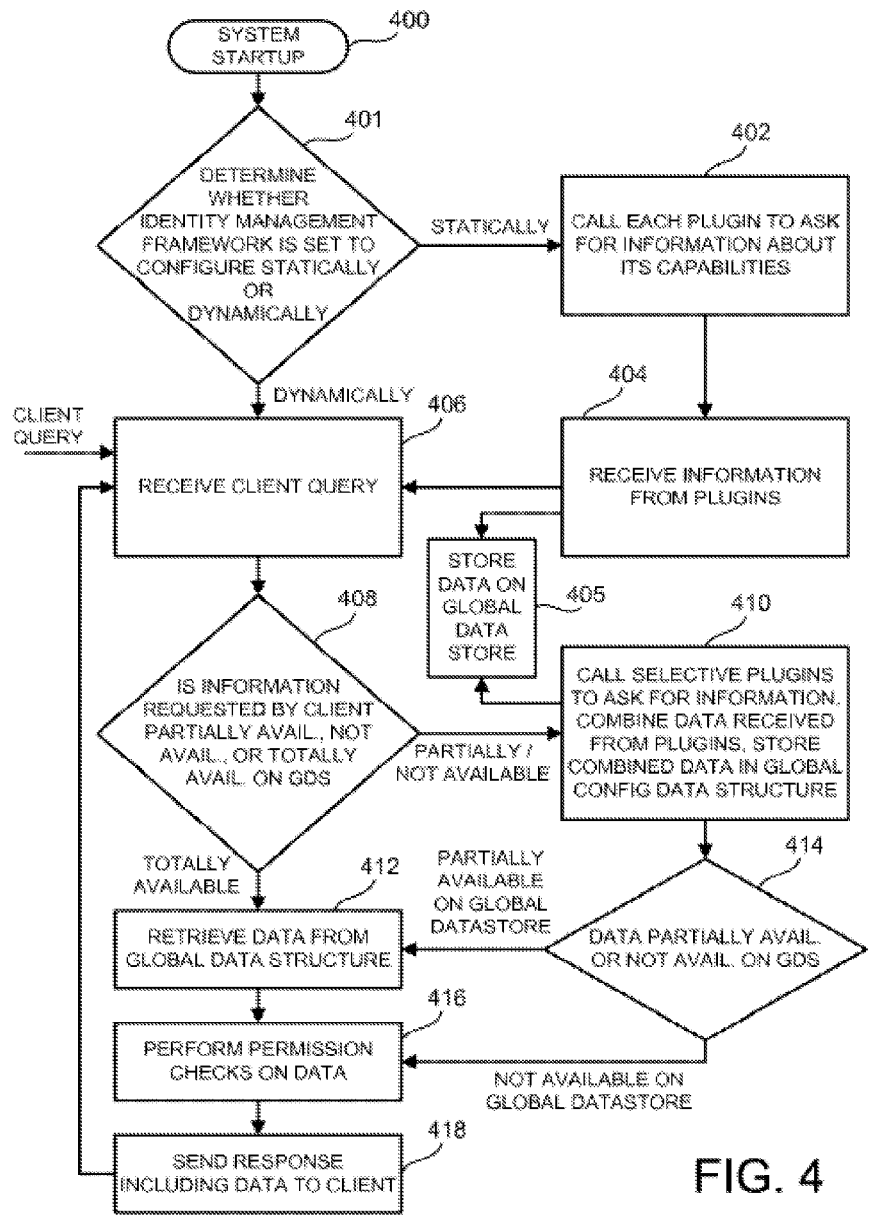
FIG. 4 is a flowchart showing a method for configuring and querying an identity management framework, in accordance with an embodiment of the present invention.

In FIG. 4, an embodiment of the present invention provides a method for configuring and querying an Identity Management Framework 103 for supported types and operations etc. As mentioned above, the Identity Management Framework 103 can be configured statically or dynamically.

In an initial step 400, as will be recognized by those of ordinary skill in the art, system startup processing is performed.

In step 401, determine whether the Identity Management Framework 103 is set to be configured statically or dynamically. If the Identity Management Framework 103 is configured statically, the method continues with step 402. Otherwise, if the Identity Management Framework 103 is configured dynamically, the method continues with step 406.

In step 402, during system initialization and/or before any Client 106 request is received by the Identity Management Framework 103, the Framework Layer 204 of the Identity Management Framework 103 calls each Plug-in module 208 (see FIG. 2) via the SPI Layer 206 and asks each Plug-in module 208 to report its capabilities (i.e. identity specific information that includes all of the identity types, identities, identity names and attributes etc.) that the Plug-in module 208 knows. The method continues in step 404.

In step 404, the Framework Layer 204 receives the identity specific information from all of the Plug-in module(s) 208 and, in step 405, stores the identity specific information on the Global Data Store 210 in corresponding entries of the Global Configuration Data Structure 300. In this manner, the Framework Layer 204 of the Identity Management Framework 103 can have the capability to respond to Client 106 requests without further calls (or limited calls) to the Plug-in module(s) 208, since the identity specific information corresponding to each Plug-in module 208 is already stored on the Global Data Store 210 in the Global Configuration Data Structure 300. The method continues in step 406.

In step 406, the API Layer 202 of the Identity Management Framework 103 receives a Client 106 query and forwards the query to the Framework Layer 204. The form of the query can be, for example, getIdentityTypes( ), getOperations( ), getIdentity( ), etc. A getIdentityTypes( ) function call, for example, can return a list of all of the identity types supported by the System 100 across all Plug-ins 208 etc. A getOperations( ) function call can return a list of all of the operations supported by the System 100 across all of the Plug-ins 208, or it can return only the operations supported by a particular Plug-in 208, or Identity Type, etc. It is important to note, however, that embodiments of the present invention are not limited to a specific query or a specific query form, and can include any query that is supported by the API 202.

In step 408, after receiving the Client 106 query, the Framework Layer 204, determines whether the information requested by the Client 106 is partially available, not available, or totally available from the Global Configuration Data Structure 300. If the information requested by the Client 106 is partially available or not available from the Global Configuration Data Structure 300, the method continues in step 410. Otherwise, if all of the information requested by the Client 106 is available from the Global Configuration Data Structure 300, the method continues in step 412.

In step 410, because the information requested by the Client 106 is either partially available or not available from the Global Configuration Data Structure 300, the Framework Layer 204 selectively calls the Plug-in(s) 208 that can provide the information required to respond to the Client 106 request and combines all of the data received across the selectively called Plug-in module(s) 208. At some point, in step 405, the Framework Layer 204 can store the combined data received from the Plug-in module(s) 208 in the Global Configuration Data Structure 300. In this manner, the Global Configuration Data Structure 300 is incrementally (or dynamically) populated. The method continues in step 414.

In step 412, the Framework Layer 204 retrieves any required data from the Global Configuration Data Structure 300 stored on the Global Data Store 210. The method continues in step 416.

In step 414, determine whether the information requested by the Client 106 query was partially available from the Global Configuration Data Structure 300 or whether the information requested by the Client 106 query was totally unavailable from the Global Configuration Data Structure 300. If the information was partially available, the method continues in step 412. Otherwise, if the information was totally unavailable, the data has already been retrieved in step 410 from the Plug-in module(s) 208 and, therefore, the method continues in step 416.

In step 416, the Framework Layer 204 performs permission checks on the data received from the Plug-in module(s) 208 in step 410 and the data retrieved from the Global Configuration Data Structure 300 in step 412 to verify that the Client 106 requesting the data has permission to receive the data. If permission is granted on all or a portion of the data, the data passing the permission checks is returned to the Client 106 in step 418, otherwise no data is returned to the Client 106.

In step 418, the Framework Layer 204 sends a response to the Client 106 via the API Layer 202. If the information requested by the Client 106 was partially available from the Global Configuration Data Structure 300, the response sent to the Client 106 by the Framework Layer 204 includes the information retrieved from the Global Configuration Data Structure 300 in step 412 and the combined information retrieved from the Plug-in module(s) 208 in step 410. If the information requested by the Client 106 was not available in the Global Configuration Data Structure 300, the response sent to the Client 106 by the Framework Layer 204 includes the combined information retrieved from the Plug-in module(s) 208 in step 410. If the information requested by the Client 106 was available in the Global Configuration Data Structure 300, the response sent to the Client 106 by the Framework Layer 204 includes the information retrieved from the Global Configuration Data Structure 300 in step 412. Steps 405 and 406 through 418 are repeated as necessary.

An advantage of the query capability of embodiments of the present invention is to provide a "smart" approach to access management where administrators, other utilities, or applications, etc. can have the capability to make advance determinations, without any prior knowledge, about the identity types and/or operations etc supported by a system. This is an advantage over conventional systems where, for example, an user or application would simply assume that certain actions were supported by a system and would attempt these actions only to discover that the action is not supported by the system.

In view of the discussion above, FIG. 5A is an illustration of an embodiment of an exemplary computer system 500 suitable for use with the present invention including display 503 having display screen 505. Cabinet 507 houses standard computer components (not shown) such as a disk drive, CDROM drive, display adapter, network card, random access memory (RAM), central processing unit (CPU), and other components, subsystems and devices. User input devices such as a mouse 511 having buttons 513, and keyboard 509 are shown.

Other user input devices such as a trackball, touch-screen, digitizing tablet, etc. can be used. In general, the computer system is illustrative of but one type of computer system, such as a desktop computer, suitable for use with the present invention. Computers can be configured with many different hardware components and can be made in many dimensions and styles (e.g. laptop, palmtop, pentop, server, workstation, mainframe). Any hardware platform suitable for performing the processing described herein is suitable for use with the present invention.

FIG. 5B illustrates subsystems that might typically be found in a computer such as computer 500. In FIG. 5B, subsystems within box 520 are directly interfaced to internal bus 522. Such subsystems typically are contained within the computer system such as within cabinet 507 of FIG. 5A. Subsystems include input/output (I/O) controller 524, System Random Access Memory 9RAM) 526, Central Processing Unit (CPU) 528, Display Adapter 530, Serial Port 540, Fixed Disk 542 and Network Interface Adapter 544. The use of bus 522 allows each of the subsystems to transfer data among the subsystems and, most importantly, with the CPU. External devices can communicate with the CPU or other subsystems via the bus 522 by interfacing with a subsystem on the bus. Monitor 546 connects to the bus through Display Adapter 530. A relative pointing device (RPD) 548 such as a mouse connects through Serial Port 540. Some devices such as a Keyboard 550 can communicate with the CPU by direct means without using the main data bus as, for example, via an interrupt controller and associated registers (not shown).

As with the external physical configuration shown in FIG. 5A, many subsystem configurations are possible. FIG. 5B is illustrative of but one suitable configuration. Subsystems, components or devices other than those shown in FIG. 5B can be added. A suitable computer system can be achieved without using all of the subsystems shown in FIG. 5B. For example, a standalone computer need not be coupled to a network so Network Interface 544 would not be required. Other subsystems such as a CDROM drive, graphics accelerator, etc. can be included in the configuration without affecting the performance of the system of the present invention.

Figure 5C:
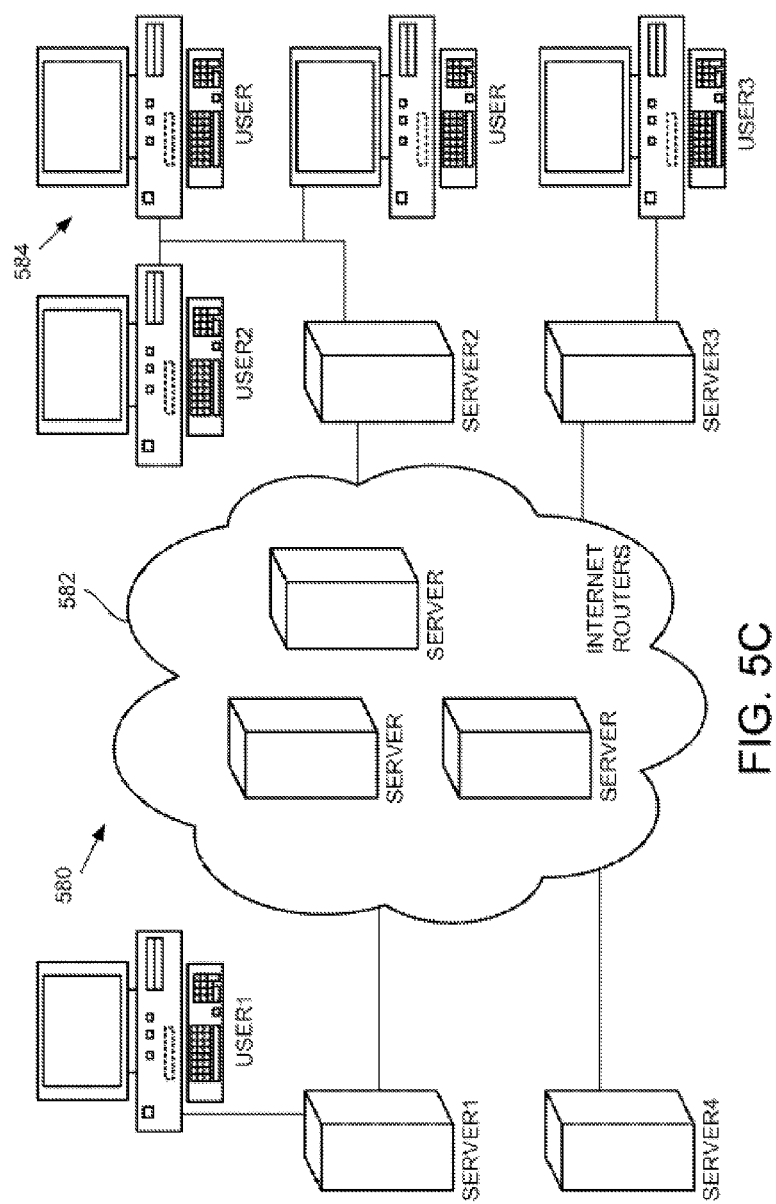
FIG. 5C is a generalized diagram of a typical network suitable for use with the present invention.

FIG. 5C is a generalized diagram of a typical network. In FIG. 5C, the network system 580 includes several local networks coupled to the Internet. Although specific network protocols, physical layers, topologies, and other network properties are presented herein, embodiments of the present invention are suitable for use with any network.

In FIG. 5C, computer USER1 is connected to Server1. This connection can be by a network such as Ethernet, Asynchronous Transfer Mode, IEEE standard 1553 bus, modem connection, Universal Serial Bus, etc. The communication link need not be wire but can be infrared, radio wave transmission, etc. Server1 is coupled to the Internet. The Internet is shown symbolically as a collection of sever routers 582. Note that the use of the Internet for distribution or communication of information is not strictly necessary to practice the present invention but is merely used to illustrate embodiments, above. Further, the use of server computers and the designation of server and client machines are not critical to an implementation of the present invention. USER1 Computer can be connected directly to the Internet. Server1's connection to the Internet is typically by a relatively high bandwidth transmission medium such as a T1 or T3 line.

Similarly, other computers at 584 are shown utilizing a local network at a different location from USER1 computer. The computers at 584 are couple to the Internet via Server2. USER3 and Server3 represent yet a third installation.

Note that the concepts of "client" and "server," as used in this application and the industry are very loosely defined and, in fact, are not fixed with respect to machines or software processes executing on the machines. Typically, a server is a machine or process that is providing information to another machine or process, i.e., the "client," that requests the information. In this respect, a computer or process can be acting as a client at one point in time (because it is requesting information). Some computers are consistently referred to as "servers" because they usually act as a repository for a large amount of information that is often requested. For example, a World Wide Web (WWW, or simply, "Web") site is often hosted by a server computer with a large storage capacity, high-speed processor and Internet link having the ability to handle many high-bandwidth communication lines.

A server machine will most likely not be manually operated by a human user on a continual basis, but, instead, has software for constantly, and automatically, responding to information requests. On the other hand, some machines, such as desktop computers, are typically though of as client machines because they are primarily used to obtain information from the Internet for a user operating the machine.

Depending on the specific software executing at any point in time on these machines, the machine may actually be performing the role of a client or server, as the need may be. For example, a user's desktop computer can provide information to another desktop computer. Or a server may directly communicate with another server computer. Sometimes this characterized as "peer-to-peer," communication. Although processes of the present invention, and the hardware executing the processes, may be characterized by language common to a discussion of the Internet (e.g., "client," "server," "peer") it should be apparent that software of the present invention can execute on any type of suitable hardware including networks other than the Internet.

Although software of the present invention may be presented as a single entity, such software is readily able to be executed on multiple machines. That is, there may be multiple instances of a given software program, a single program may be executing on different physical machines, etc. Further, two different programs, such as a client a server program, can be executing in a single machine, or in different machines. A single program can be operating as a client for information transaction and as a server for a different information transaction.

A "computer" for purposes of embodiments of the present invention may include any processor-containing device, such as a mainframe computer, personal computer, laptop, notebook, microcomputer, server, personal data manager or "PIM" (also referred to as a personal information manager or "PIM") smart cellular or other phone, so-called smart card, set-top box, or any of the like. A "computer program" may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" for purposes of embodiments of the present invention may be any medium that can contain, store, communicate, propagate, or transport the computer program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. The computer readable medium may have suitable instructions for synchronously presenting multiple video program ID streams, such as on a display screen, or for providing for input or presenting in accordance with various embodiments of the present invention.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method, comprising operations of:
   receiving a first query from a user of a client device connected to a network for a system, wherein the first query seeks information as to identity types supported by the system;
   responding to the first query with a list of supported identity types, wherein the supported identity types include at least a hardware device, a role, and a user identity type and wherein the list is retrieved from a global configuration data structure in a global data store that is separate from any data stores associated with an identity type;
   receiving a second query from the user for identities of the hardware devices associated with one of the supported identity types; and
   responding to the second query with the identity of a specific hardware device, if the user is permitted to access the specific hardware device according to permissions obtained through the global configuration data structure, and further comprising,
   receiving a third query from the user for connection configurations for the specific hardware device;
   determining that the connection configurations are partially available in the global configuration data structure;
   retrieving over the network at least one connection configuration from the specific hardware device, using a plugin associated with the specific hardware device; and
   responding to the third query with the at least one retrieved connection configuration, if the user is permitted to use the retrieved connection configuration according to permissions obtained through the global configuration data structure, wherein each operation of the method is executed by one or more processors.

2. The method of claim 1, further comprising operations of:
   receiving a fourth query from the user for supported operations of the specific hardware device;

determining that the supported operations are partially available in the global configuration data structure;
retrieving over the network at least one supported operation from the specific hardware device, using a plugin associated with the specific hardware device; and
responding to the fourth query with the retrieved supported operation, if the user is permitted to perform the retrieved supported operation on the specific hardware device according to permissions obtained through the global configuration data structure.

3. The method of claim 1, further comprising an operation of:
responding to the third query with a supported operation stored in the global configuration data structure.

4. The method of claim 3, further comprising an operation of:
storing the at least one retrieved supported operation in the global configuration data structure.

5. The method of claim 1, further comprising an operation of:
responding to the third query with a connection configuration stored in the global configuration data structure.

6. The method of claim 1, further comprising an operation of:
storing the at least one retrieved connection configuration in the global configuration data structure.

7. One or more non-transitory computer-readable media persistently storing instructions that, when executed by a processor, perform the following operations:
receive a first query from a user of a client device connected to a network for a system, wherein the first query seeks information as to identity types supported by the system;
respond to the first query with a list of supported identity types, wherein the supported identity types include at least a hardware device, a role, and a user identity type and wherein the list is retrieved from a global configuration data structure in a global data store that is separate from any data stores associated with an identity type;
receive a second query from the user for identities of the hardware devices associated with one of the supported identity types; and
respond to the second query with the identity of a specific hardware device, if the user is permitted to access the specific hardware device according to permissions obtained through the global configuration data structure, and further comprising,
receive a third query from the user for connection configurations for the specific hardware device;
determine that the connection configurations are partially available in the global configuration data structure;
retrieve over the network at least one connection configuration from the specific hardware device, using a plugin associated with the specific hardware device; and
respond to the third query with the at least one retrieved connection configuration, if the user is permitted to use the retrieved connection configuration according to permissions obtained through the global configuration data structure.

8. The one or more non-transitory computer-readable media of claim 7, further comprising operations of:
receive a fourth query from the user for supported operations of the specific hardware device;
determine that the supported operations are partially available in the global configuration data structure;
retrieve over the network at least one supported operation from the specific hardware device, using a plugin associated with the specific hardware device; and
respond to the fourth query with the retrieved supported operation, if the user is permitted to perform the retrieved supported operation on the specific hardware device according to permissions obtained through the global configuration data structure.

9. The one or more non-transitory computer-readable media of claim 7, further comprising an operation of:
respond to the third query with a supported operation stored in the global configuration data structure.

10. The one or more non-transitory computer-readable media of claim 8, further comprising an operation of:
store the at least one retrieved supported operation in the global configuration data structure.

11. The one or more non-transitory computer-readable media of claim 8, further comprising an operation of:
respond to the third query with a connection configuration stored in the global configuration data structure.

12. The one more non-transitory computer-readable media of claim 8, further comprising an operation of:
store the at least one retrieved connection configuration in the global configuration data structure.

13. A method, comprising operations of:
receiving a first query from a user of a client device connected to a network for a system, wherein the first query seeks information as to identity types supported by the system;
responding to the first query with a list of supported identity types, wherein the supported identity types include an identity type for a hardware device and wherein the list is retrieved from a global configuration data structure in a global data store that is separate from any data stores associated with an identity type;
receiving a second query from the user for identities of the hardware devices associated with the identity type for the hardware device; and
responding to the second query with the identity of a specific hardware device, if the user is permitted to access the specific hardware device according to permissions obtained through the global configuration data structure, and further comprising,
receiving a third query from the user for connection configurations for the specific hardware device;
determining that the connection configurations are partially available in the global configuration data structure;
retrieving over the network at least one connection configuration from the specific hardware device, using a plugin associated with the specific hardware device and storing the at least one retrieved connection configuration in the global configuration data structure; and
responding to the third query with the at least one retrieved connection configuration, if the user is permitted to use the retrieved connection configuration according to permissions obtained through the global configuration data structure, wherein each operation of the method is executed by one or more processors.

14. The method of claim 13, further comprising operations of:
receiving a fourth query from the user for supported operations of the specific hardware device;
determining that the supported operations are partially available in the global configuration data structure;

retrieving over the network at least one supported operation from the specific hardware device, using a plugin associated with the specific hardware device; and responding to the fourth query with the retrieved supported operation, if the user is permitted to perform the retrieved supported operation on the specific hardware device according to permissions obtained through the global configuration data structure.

15. The method of claim 13, further comprising an operation of:

responding to the third query with a supported operation stored in the global configuration data structure.

16. The method of claim 13, further comprising an operation of:

storing the at least one retrieved supported operation in the global configuration data structure.

17. The method of claim 13, further comprising an operation of;

responding to the third query with a connection configuration stored in the global configuration data structure.

* * * * *